United States Patent [19]

Ogawa et al.

[11] 4,400,080
[45] Aug. 23, 1983

[54] TWO-DRUM TYPE COPYING MACHINE HAVING IMPROVED ILLUMINATION EFFICIENCY

[75] Inventors: Ryota Ogawa; Michiro Oishi; Yasunori Arai, all of Tokyo, Japan

[73] Assignee: Asahi Kogaku Kogyo Kabushiki Kaisha, Tokyo, Japan

[21] Appl. No.: 304,469

[22] Filed: Sep. 22, 1981

[30] Foreign Application Priority Data

Sep. 24, 1980 [JP] Japan .............................. 55-131665
Jun. 15, 1981 [JP] Japan .............................. 55-92009

[51] Int. Cl.³ .......................................... G03G 15/00
[52] U.S. Cl. ...................................... 355/11; 355/49; 355/51; 355/66
[58] Field of Search ................. 355/11, 3 R, 49, 51, 355/65, 66

[56] References Cited

U.S. PATENT DOCUMENTS

| | | | |
|---|---|---|---|
| 3,615,128 | 10/1971 | Bhagat | 355/3 R |
| 3,694,073 | 9/1972 | Bhagat | 355/3 R |
| 3,752,573 | 8/1973 | Miller | 355/11 |
| 3,936,171 | 2/1976 | Brooke | 355/3 R |
| 4,134,670 | 1/1979 | Spinelli | 355/3 R |
| 4,162,843 | 7/1979 | Inoue et al. | 355/3 TR |
| 4,180,318 | 12/1979 | Matsumoto et al. | 355/11 |
| 4,320,955 | 3/1982 | Kay | 355/3 R |

Primary Examiner—R. L. Moses
Attorney, Agent, or Firm—Sughrue, Mion, Zinn, Macpeak & Seas

[57] ABSTRACT

A two-drum copying machine having rotatable memory and transfer drums in which an optical path between an object point on the memory drum and an image point on the transfer drum is arranged obliquely with respect to the optical axis of a lens focusing light reflected from the object point onto the image point. A rotatable mirror is first set in a position to reflect light from an original to be copied onto the memory drum. After the memory drum has been rotated through one complete revolution and an image of the original formed thereon, a light source is turned on to project light directly onto the memory drum to illuminate the image. The mirror is then rotated out of the optical path to open the optical path through the lens between the object and image points. In a preferred embodiment, the sum of the angles of incidence and reflection of light at the object point is set to be twice the angle formed between the optical path and the optical axis of the lens. An elliptical curved mirror may be used to direct light from the light source onto the memory drum.

8 Claims, 12 Drawing Figures

TWO-DRUM TYPE COPYING MACHINE HAVING IMPROVED ILLUMINATION EFFICIENCY

BACKGROUND OF THE INVENTION

This invention relates to a copying machine having two drums.

A copying machine having two drums, namely a memory drum and a transfer drum, has been disclosed in Japanese Patent Application No. 37289/1980 filed by the present applicant. In such a copying machine, the memory drum 1 is spaced a predetermined distance from the transfer drum 2, and both are arranged on the optical axis of an image forming lens 3 which is interposed between the two drums 1 and 2, as shown in FIGS. 1 through 3. A light source 4 for exposure is provided near the memory drum 1. A mirror 5 is interposed between the memory drum 1 and the transfer drum 2 and is on the central optical axis of the lens 3 (hereinafter referred to as "an optical axis 9"). The mirror 5 can be retracted from the path of the optical axis 9. An original 6, an original stand 7 and a light source for illuminating the original 6 are shown in the upper part of each figure.

In operation, the light source 8 irradiates the original 6 placed on the transparent original stand 7. As the transparent original stand 7 is moved while the light source 8 remains stationary, light from the light source 8 irradiates the original 6 on the transparent original stand 7 from one end to the other end and provides the optical data of the original to the memory drum 1 through the mirror 5 and the image forming lens 3. As the memory drum 1 rotates in synchronization with the movement of the original stand 7, an electrostatic latent image of the original 6 is formed on the memory drum 1. The latent image is developed with toner into a memory image.

Subsequently, the illuminating device 4 applies light to the transfer point 1a of the memory drum 1 as the latter is rotated. The incident light is reflected, in the form of optical data of the memory image formed on the memory drum 1, along the optical axis 9, and is then applied to the transfer drum 2 through the image forming lens 3.

As the transfer drum 2 rotates in synchronization with the memory drum 1, a secondary electrostatic latent image is formed on the transfer drum 2 in accordance with the optical data of the memory image received from the memory drum 1. The latent image is developed with toner into a toner image which is transferred onto a sheet or the like to complete the copying operation.

An important feature of this type of copying machine resides in that, once the secondary original is formed through the first image forming operation, a plurality of copies of the original can be obtained in a short time by repeating the second image forming operation. For this purpose, the reflection coefficient of the memory drum 1 is made high, and its surface smooth, so that the overall reflection characteristics of the memory drum 1 will be high. However, the copying machine is inefficient in that light from the light source 4 is regularly reflected by the memory drum as shown in FIG. 2, and a part of the energy of the light source 4 consequently is applied to the lens 3. The difficulty may be eliminated by employing a method in which the reflection characteristic of the surface of the memory drum 1 is made more diffuse to allow a part of the relfected light to pass through the lens. However, the method is still disadvantageous in that the efficiency of diffuse reflection is generally low, resulting still in a loss of energy of the light source 4. Part of this problem is due to the fact that the central optical axis of the lens 3 and the center of at least one of the two drums lie on the same straight line.

A further cause of inefficiency will be explained with reference to FIG. 4. When the copying machine of FIG. 1 is viewed from above as shown in FIG. 4a, a light beam 21 reflected from the center of the memory drum 1 is applied to the entrance pupil 3a of the image forming lens 3, thus contributing to the formation of an image on the transfer drum 2; however, some of the light beams applied to the peripheral portion 22 of the memory drum 1 are not reflected to the entrance pupil 3a of the lens 3 as indicated by the broken line 23 but are instead reflected outside of the lens. These light beams cannot contribute to the formation of an image on the transfer drum 2, thus further contributing to inefficiency.

The copying machine may be improved by employing a method in which the smooth surface of the memory drum 1 is modified into a rough surface but the improvement will generally not be sufficient.

In another method of improving the copying machine, the illuminating device 4 can be replaced by an elongated light source 25 as shown in FIG. 4b. In this method, a memory image formed on a peripheral portion of the memory drum 1 is irradiated by a ray 27 from a point 26 on the light source 25 and the incident light is reflected, as optical data, to the image forming lens 33. However, the light beam from the point 26 is scattered in various directions 27', 27'', and so forth, different from the direction of the ray 27, and therefore the loss of energy is still considerable due to the rays indicated by 27', 27'', etc. If the light source 25 is nonuniform in luminance because of an unsatisfactory filament arrangement, then an image formed on the transfer drum 2 will include bright stripes, and accordingly the resultant copy is irregular.

SUMMARY OF THE INVENTION

Accordingly, it is an object of the invention to improve the efficiency of a copy machine.

According to this invention, both of the two drums are set off from the optical axis 9 of the lens so that light from the light source 4, after being reflected, is applied through the center of the lens 3 to the transfer drum 2. Furthermore, the arrangement of the copying machine is so designed that the image of the light source 4 is formed by the lens 3 at a location immediately before the transfer drum 2, whereby the above-described difficulties accompanying the conventional copying machines are eliminated to make it possible to transfer the image of an original clearly.

According to a further improvement provided by this invention, the light source for illuminating the memory drum is arranged for indirect radiation only, with the light source being directed toward an eleptically-shaped mirror which will concentrate the illuminating light onto an image forming lens after reflection from the surface of the memory drum. A light intercepting plate is disposed between the light source and the memory drum to prevent direct irradiation of the memory drum by the light source, thereby contributing to the over all uniformity of the reproduced image.

BRIEF DESCRIPTION OF THE DRAWINGS

This invention will be more clearly understood from the following description in conjunction with the accompanying drawings, in which:

FIGS. 3a and 3b are brief diagrammatic top plane views of conventional two-drum copying machines;

DESCRIPTION OF THE PREFERRED EMBODIMENTS

Figure 1:
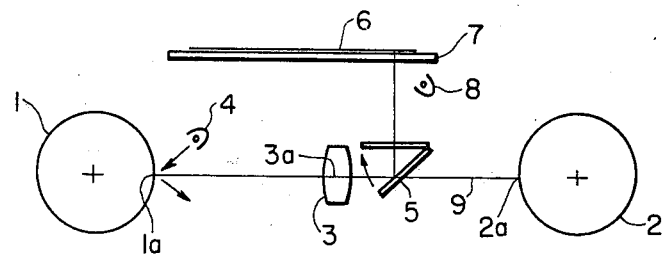
FIGS. 1 through 3 are brief diagrammatic side views of conventional two-drum copying machines.
Figure 2:
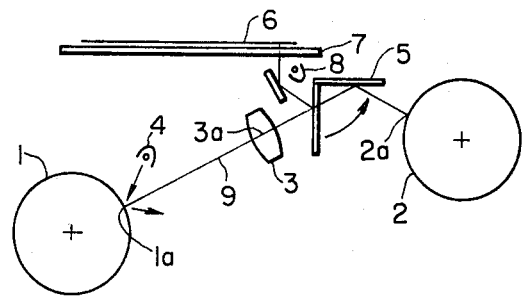
Figure 3:
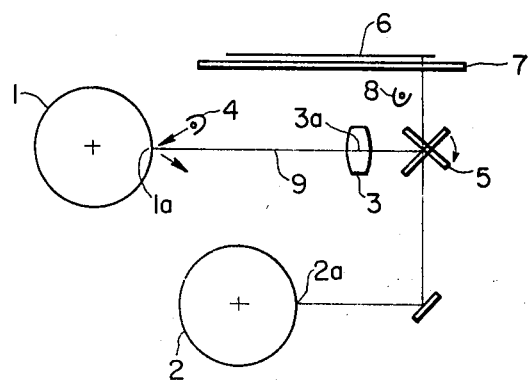
Figure 5:
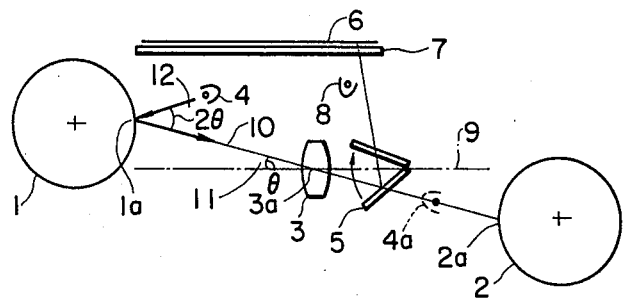
FIG. 5 is a schematic side view of a copying machine similar to that shown in FIG. 1 but including the improvement according to a first embodiment of the present invention.
Figure 6:
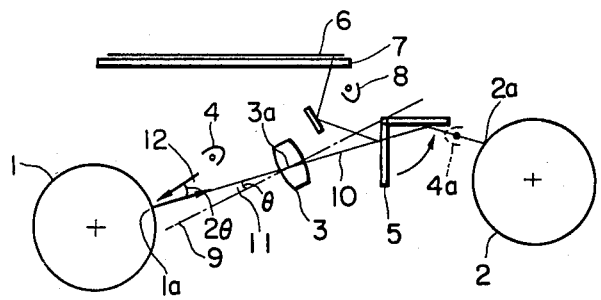
FIG. 6 is a side diagrammatic view of a copying machine similar to that shown in FIG. 2 but including an improvement according to a first embodiment of this invention.
Figure 7:
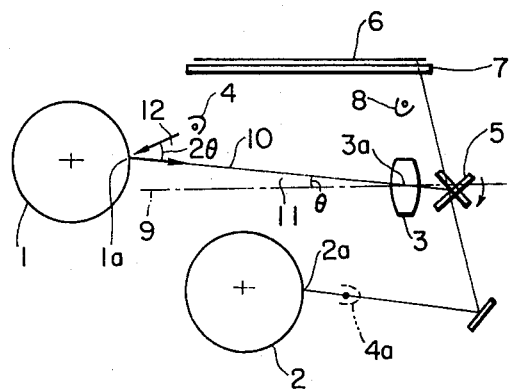
FIG. 7 is a diagrammatic side view of a copying machine similar to that shown in FIG. 3 but embodying an improvement according to a first embodiment of this invention.

One example of a copying machine according to this invention will be described with reference to FIGS. 5 through 7 in detail. The copying machines shown in FIGS. 5 through 7 include the same components as those shown in FIGS. 1 through 3. However, it should be noted that an object point 1a on the memory drum 1 is on a slanting optical axis 10 which forms an angle ($\theta$) 11 with the optical axis 3a of the image forming lens 3, and an image point 2a on the transfer drum 2 is also on the slanting optical axis 10. The transfer drum 2 is positioned slightly behind the image 4a of the light source 4 which is formed by the lens 3. The light source 4 is positioned near the memory drum 1 and on a line which forms an angle ($2 \times \theta$) 12 with the slanting optical axis 10. The mirror 5 is obliquely set on the slanting optical axis 10 is such a manner that it can be retracted from or displaced from the slanting optical axis 10.

With this copying machine, the image of an original is formed on the memory drum 1 similarly as in the case of the conventional copying machine. When the memory drum 1 has made one revolution, the light source 4 is turned on, and light from the light source 4, after being reflected by the memory drum, is applied through the center of the lens 3 to the transfer drum 2. In this operation, the mirror 5 is retracted from the slanting optical axis 10. The image of the optical source 4 is formed at a position 4a immediately before the transfer drum 2.

As is apparent from the above description, the light beam from the light source is reflected directly by the memory drum and is then applied through the lens to the transfer drum. Therefore, the intensity of the light transmitted to the transfer drum is much higher than that of the light transmitted in the conventional copying machine. Accordingly, it is unnecessary to particularly increase the energy of the light source, and the copying machine of the invention can perform optical transmission with considerably high efficiency.

A further improvement according to the present invention will now be explained with reference to FIGS. 8a–8c.

Figure 8A:
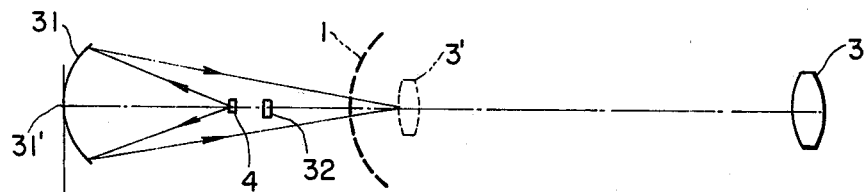
FIGS. 8a–8c are diagrammatic illustrations for an explanation of an improvement according to a second embodiment of this invention.

FIG. 8a is a diagram showing the relationships between an illuminating device 4, a reflecting mirror 31, a light intercepting plate 32, a memory drum 1 and an image forming lens 3 (mirrors which are not essential for explaining the optical principle are not shown). In FIG. 8a, the lens 3 is shown at a position where an image is formed by light reflected from the memory drum 1.

Figure 8B:
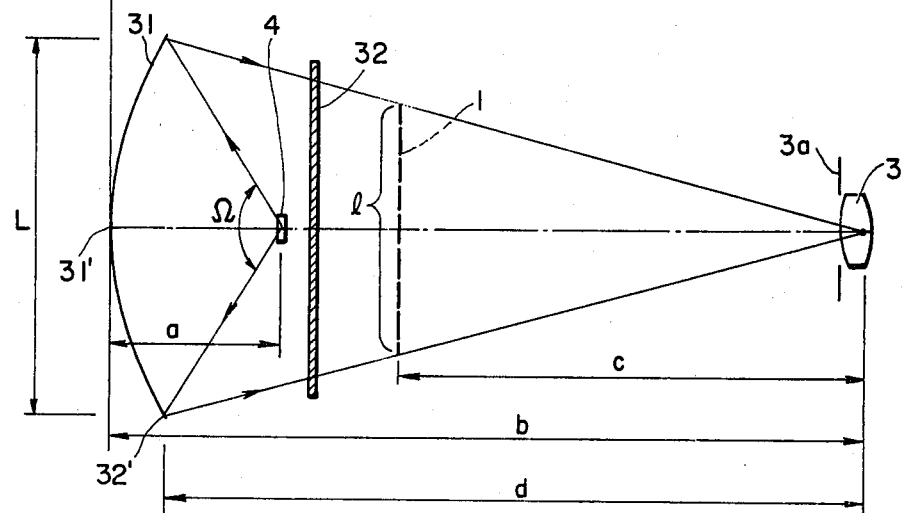

FIG. 8b is a plane view of the various components of the optical system of exposure, as viewed from above. A light beam having a large divergent angle $\Omega$ from the illuminating device 4 is converted into a convergent beam by the reflecting mirror 31, which directs the beam towards the image forming lens 3. Before reaching the lens 3, the convergent beam irradiates the memory drum 1 over a desired transfer width l, where it is reflected and is then applied to the lens 3. Since the plane component of the memory drum 1 has no curvature, the beam can be considered as if reflected by a plane mirror. Therefore, by shaping the reflecting mirror 31 into a part of an ellipse having the light source 4 and the lens 3 at its focal points, each plane component of an original's image on the memory drum 1 which arrives at the transfer point during rotation of the memory drum 1 can be effectively projected to the image forming lens 3.

It is assumed that the optical relative positions of the illuminating device 4, the reflecting mirror 31, the memory drum 1 and the image forming lens 3 are represented by a, b, c and d as shown in FIG. 8b. The size L of the reflecting mirror 3 can then be defined by the following espression:

$$L > dl/c$$

In this case, optical data can be taken from as much as a transfer width l of the memory drum 1. The image of the light source is enlarged by a magnification of b/a and is applied to the entrance pupil 3a of the lens 3. Even if the size of the light source is larger than a/b times the size of the entrance pupil 3a, the only light reaching the lens 3 is that which is reflected and focussed by the mirror 31, and a clear image will be obtained.

Figure 4A:
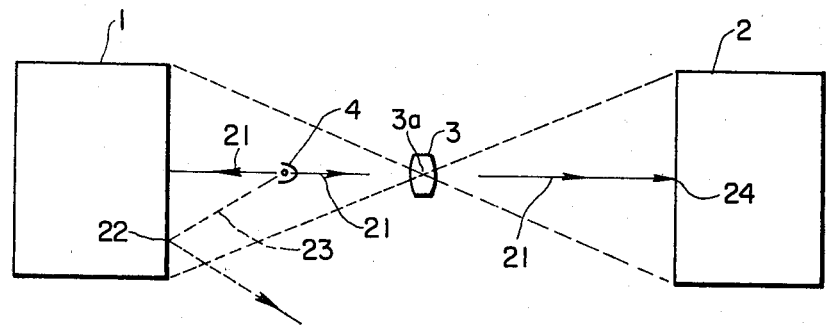
Figure 4B:
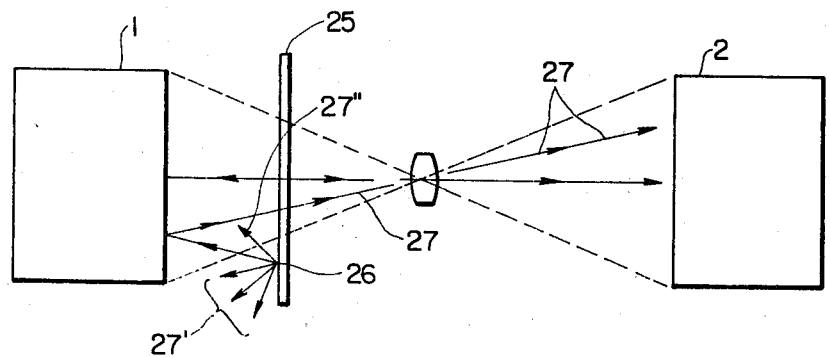
Figure 8C:
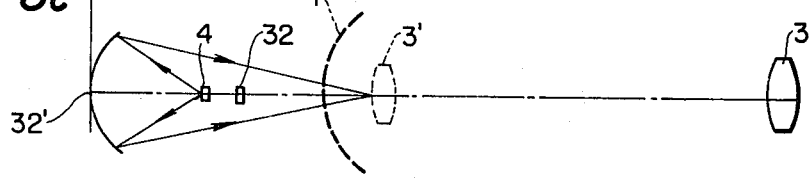

FIGS. 8a and 8c are side views showing the positional relationships of the various components in the above-described optical system of exposure. In these figures, the memory drum 1 appears circular, and acts as a convex mirror. Therefore, assuming an image 3′ of the image forming lens 3, it is proper to consider the problem as involving optical projection from the light source 4 to the lens image 3′ through the reflection mirror 31. The side component of the reflecting mirror 31 is a part of an ellipse having the illuminating device 4 and the lens image 3′ at its focal points, and the plane component of the reflecting mirror 31 is elliptical as already described above. In the reflecting mirror, the central point 31′ in FIG. 4a is in a different position than the peripheral point 32′ in FIG. 4c, yet both must focus on the same point. Therefore, the aforementioned side component has a configuration whose curvature changes towards the peripheral point 32′ from the central point 31′. That is, the reflecting mirror 31 has a length much longer than the width of the memory drum 1 and is elliptical as viewed from above and from the side. Especially when viewed from side, the reflecting mirror is of a curved surface whose curvature changes gradually towards the periphery from the center. The shape of the mirror is more clearly shown in FIG. 9.

The light intercepting plate 32 is provided immediately behind the illuminating device 4 between the illuminating device 4 and the memory drum 1, so as to prevent direct irradiation of the memory drum 1 by the illuminating device 4. If the light intercepting plate 32 is not provided, light applied directly to the central portion of the memory drum 1 from the light source will be transmitted through the image forming lens 3 and concentrated at the central portion of the transfer drum 2, thus forming an irregular image having an overly bright central portion. Therefore, the light intercepting plate 32 should be long enough to intercept all direct radiation as shown in the figure.

Figure 9:
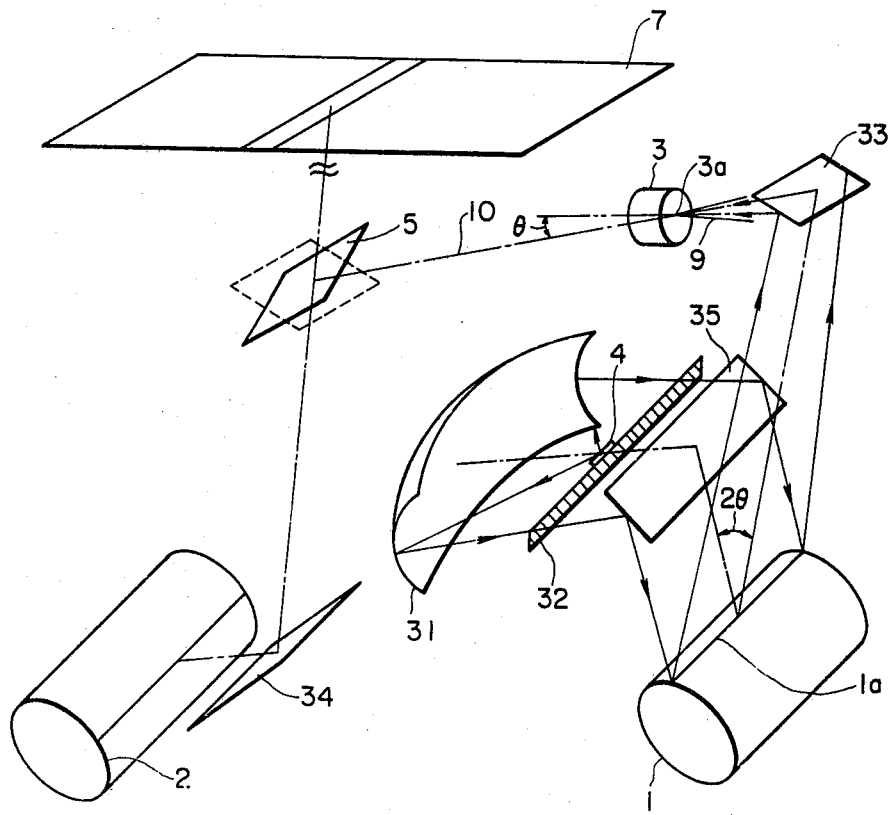
FIG. 9 is a diagrammatic illustration of a two-drum copying machine incorporating both the first and second improvements according to this invention.

FIG. 9 shows a copying machine employing an optical system of exposure having the above-described optical characteristics. Optical data from an original is reflected by a mirror 5 along the slanting optical axis 10 and is applied to the image forming lens 3. The optical data emerging from the image forming lens 3 is applied through a relay mirror 33 to the memory drum 1, so that an electrostatic latent image of the original is formed on the memory drum and is converted into a toner image with toner. Then, the illuminating device 4 irradiates the toner image at the transfer point 1a, so that the optical data of the toner image is applied through the relay mirror 33, the image forming lens 3, the mirror 5 and a transfer mirror 34 to the transfer drum 2, as a result of which a second electrostatic latent image of the original is formed on the transfer drum 2. Since the light intercepting plate 32 is provided between the light source 4 and memory drum 1, the memory drum 1 is not directly irradiated by the illuminating device. That is, the light beam from the illuminating device 4 is applied only to the reflecting mirror 31 having the above-described special elliptic configuration. The light beam reflected by the reflecting mirror 31 falls on the memory drum 1 through a mirror 35, so as to convert the original's image on the memory drum 1 into optical data. The optical data is applied to the entrance pupil 3a of the image forming lens 3 via relay mirror 33. With this configuration, a large part of the energy from the illuminating device 4, corresponding to the large angle subtended by the reflecting mirror 31, is applied to the entrance pupil 3a of the image forming lens 3, whereby image transmission to the transfer drum 2 can be achieved with high energy efficiency.

As is clear from FIG. 9, the memory drum 1 and the transfer drum 2 are disposed on the slanting optical axis 10 which forms a desired angle $\theta$ with the optical axis 9 of the image forming lens 3. In addition, the illuminating device 4 is so positioned that light from the illuminating device 4 is reflected by the memory drum 1 and the reflected light is totally reflected along the slanting optical axis 10; i.e. the sum of the incident angle and the angle of reflection is equal to $2 \times \theta$. Thus, the above-described effect becomes more significant.

In the copying machine according to the invention, the memory drum is illuminated with light from an illuminating device which is received over a wide angle by the reflecting mirror. Therefore, the optical transmission of the copying machine of the invention is much higher in energy efficiency than that of the conventional copying machine. The light intercepting plate placed behind the illuminating device prevents the direct application of light to the drum, and allows the memory drum to be irradiated only indirectly the reflecting mirror. Therefore, the illumination is effected uniformly, and the resultant copy is uniform in quality.

If the above-described reflecting mirror is not employed, several disadvantages result. For example, since the drum is cylindrical, it is necessary to provide, for instance, a refraction type cylindrical lens in the illumination system. In order to expose the large transfer width to light, this cylindrical lens must be very large, as a result of which the power of the lens is increased. In addition, the use of a Fresnel lens is required, and the copying machine is thus unavoidably intricate in its optical arrangement.

According to this invention, on the other hand, the curvature for every directional component is controlled with only one reflecting mirror, to compensate for the cylindrical configuration of the drum. And this advantageous effect is achieved with a simple arrangement constituted by only one light intercepting plate in association with the reflecting mirror.

What is claimed is:

1. In a copying machine of the type having a rotatable memory drum having an axis of rotation passing through the center thereof, a rotatable transfer drum having an axis of rotation passing through the center thereof, a lens having an optical axis and positioned in an optical path between said memory and transfer drums, and a light source for projecting light onto said memory to illuminate said memory drum, which light is reflected from said memory drum through said lens to said transfer drum, the improvement characterized in that an optical path through said lens connecting an object point on said memory drum from which light from said light source is reflected and an image point on said transfer drum is arranged obliquely to said optical axis of said lens.

2. A copying machine as defined in claim 1, wherein said optical path is a slanting optical axis passing through the center of said lens, said lens forming an image of said light source substantially on said slanting optical axis between said lens and said transfer drum.

3. A copying machine as defined in claim 1, further comprising:
   a light intercepting plate between said light source and memory drum; and
   a reflecting mirror on the side of said light source away from said memory drum, said reflecting mirror having a substantially elliptical curvature along a first direction extending parallel to said axis of rotation of said memory drum.

4. A copying machine as defined in claim 3, wherein the curvature of said reflecting mirror in a second direction perpendicular to said first direction changes with distance along said first direction of said mirror.

5. A copying machine as defined in any one of claims 1 through 4, wherein said optical path is a slanting optical axis forming an angle $\theta$ with said lens optical axis and the sum of the angles of incidence and reflection of light at said object point being substantially equal to $2\theta$ 6. A copying machine as defined in claim 1, further comprising a movable mirror movable between first and second positions, said mirror in said first position reflecting light from an original object position through said lens to said object point on said memory drum, and in said second position allowing said light from said light source reflected at said object point to travel to said image point on said transfer drum.

7. A copying machine as defined in claim 6, wherein said movable mirror in its second position is out of said optical path.

8. A copying machine as defined in claim 7, wherein said first movable mirror in its second position is disposed to reflect light to said image point on said transfer drum from said object point on said memory drum.

* * * * *